United States Patent [19]

Teraoka

[11] Patent Number: 4,470,491

[45] Date of Patent: * Sep. 11, 1984

[54] AUTOMATIC HUB CLUTCH

[75] Inventor: Masao Teraoka, Sano, Japan

[73] Assignee: Tochigi-Fuji Sangyo Kabushiki Kaisha, Tochigi, Japan

[*] Notice: The portion of the term of this patent subsequent to Apr. 10, 2001 has been disclaimed.

[21] Appl. No.: 323,708

[22] Filed: Nov. 20, 1981

[30] Foreign Application Priority Data

Apr. 28, 1981 [JP] Japan .............................. 56-62399[U]

[51] Int. Cl.³ ...................... F16D 11/00; F16D 23/02; B60K 17/34
[52] U.S. Cl. .......................................... 192/35; 192/54; 192/67 R; 192/93 A; 403/1
[58] Field of Search ...................... 192/54, 93 A, 67 R, 192/49, 35; 403/1; 180/247

[56] References Cited

U.S. PATENT DOCUMENTS

| 3,217,847 | 11/1965 | Petrak | 192/93 A X |
| 4,227,599 | 10/1980 | Ishiwata et al. | 192/54 |
| 4,238,014 | 12/1980 | Petrak | 192/54 |
| 4,262,785 | 4/1981 | Anderson et al. | 192/54 X |
| 4,266,646 | 5/1981 | Telford | 192/67 R |
| 4,269,294 | 5/1981 | Kelbel | 192/54 |
| 4,281,749 | 8/1981 | Fogelberg | |
| 4,287,972 | 9/1981 | Petrak | 192/54 |
| 4,332,304 | 6/1982 | Barnow | 180/247 X |
| 4,343,386 | 8/1982 | Schaefer et al. | 192/67 R X |
| 4,369,868 | 1/1983 | Fleitas | 192/54 X |
| 4,378,868 | 4/1983 | Petrak | 192/54 X |

FOREIGN PATENT DOCUMENTS 2084267  5/1980  United Kingdom .................. 192/54

Primary Examiner—Rodney H. Bonck
Assistant Examiner—David D. House
Attorney, Agent, or Firm—Wenderoth, Lind & Ponack

[57] ABSTRACT

An automatic hub clutch used for connection and disconnection of a drive axle with a wheel of a four-wheel drive vehicle, has a simple mechanism and a short axial length. The hub clutch includes a first spring adapted to bias a slide gear toward disengagement, and a second spring disposed radially inwardly of the slide gear and adapted to bias the slide gear toward engagement through a cam.

6 Claims, 9 Drawing Figures

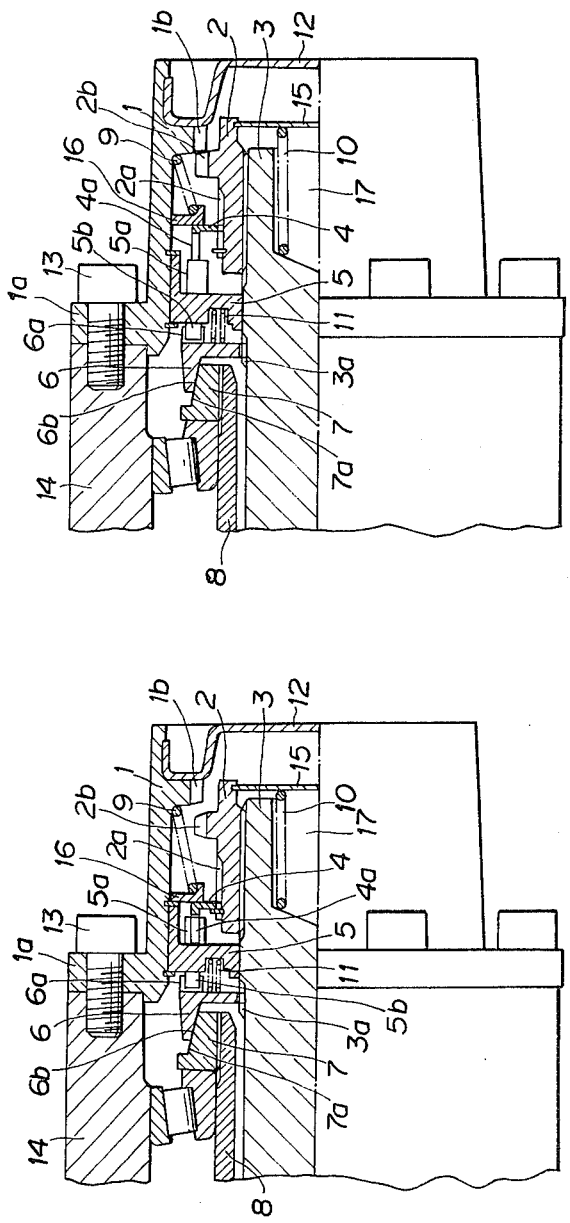

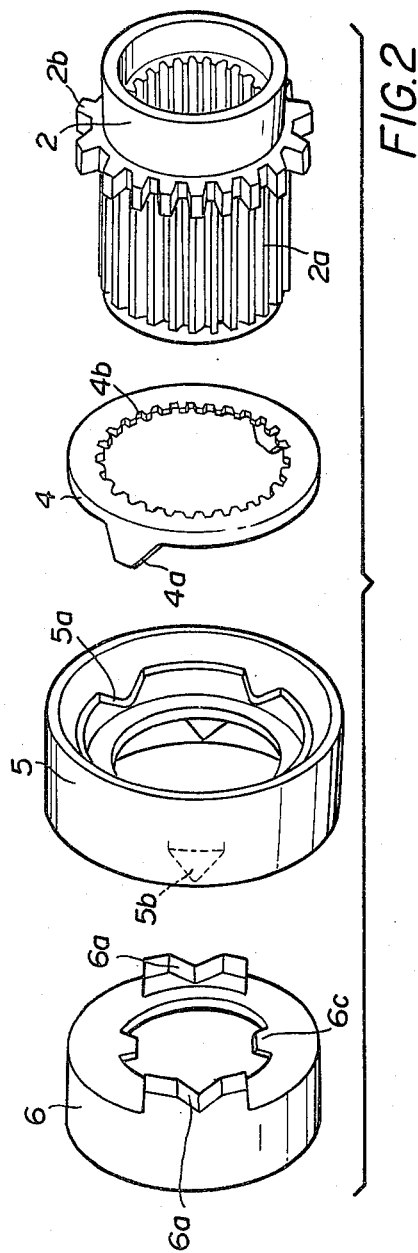
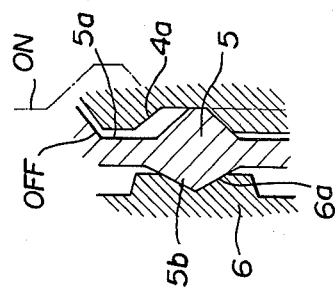

4,470,491

AUTOMATIC HUB CLUTCH

BACKGROUND OF THE INVENTION

The present invention relates to an automatic hub clutch used for connection and disconnection of a drive axle with a wheel of a four-wheel drive vehicle and more particularly, to such a hub clutch which is simple in construction and having an axial length, shorter than that of the prior art.

Heretofore, various types of hub clutches have been used for engaging a drive shaft or axle with its associated wheels in a four-wheel vehicle. For example, U.S. patent application Ser. No. 27,347 filed Apr. 5, 1979, now U.S. Pat. No. 4,281,749, discloses an automatic locking clutch comprising a return spring restricting the axial movement of a slide gear, and a thrust transmission or load spring. The return spring and the load spring are disposed axially forward and backward of the slide gear, respectively. Upon development of thrust, the return spring is compressed by a plurality of fingers extended through the slide gear to permit the slide gear to move in its axial direction, thereby engaging the slide gear with a driven gear to provide a four-wheel drive mode.

According to this clutch, the return spring can restrict the axial movement of the slide gear unless an axial thrust higher than a predetermined level is applied by cam means. Therefore, spurious movement of the slide gear may be prevented by the action of this return spring even upon an increase in viscous drag of lubricating oil resulting from reduction of atmospheric temperatures or upon development of gravity in the lateral direction resulting from sudden cornering of the vehicle and the like.

However, such an automatic locking clutch has the disadvantage that the axial length of the clutch becomes larger because the return spring, the slide gear and the thrust transmission spring are arranged axially in series with respect to each other, and the fingers extending through the slide gear, and its associated means make the construction of the clutch very complicated. The large axial size of the clutch results in a legal problem due to protruding of the rotating portions out of the outside width of car body, the problem that the protruding rotating portions are subject to damage upon off-load running, and so forth.

SUMMARY OF THE INVENTION

This invention relates to an improved automatic hub clutch which will overcome the problems described above.

It is therefore an object of this invention to provide an improved automatic hub clutch having a simple mechanism or construction and a short axial length for connection and disconnection of a drive axle with a wheel of a four-wheel drive vehicle.

It is another object of this invention to provide an improved automatic hub clutch having a mechanism to prevent spurious movement of a slidable or movable member ot cause clutch engagement even upon an increase in viscous drag of a lubricant resulting from reduction of atmospheric temperatures or upon development of lateral gravity resulting from sudden cornering of the vehicle.

It is still another object of this invention to provide an improved automatic hub clutch having a mechanism capable of developing the braking force only upon clutch connection and disconnection, thereby lowering energy loss and temperatures of the braking member and improving durability of the braking member.

Other objects include the provision of a simple mechanism which may be manufactured at relatively low cost and which is easy and simple to install.

According to a preferred embodiment of this invention, the automatic hub clutch comprises a slide gear engaged to a drive shaft through splines formed thereon and movable in the axial direction of the drive shaft, a housing adapted for engagement and disengagement with the slide gear upon axial movement of the slide gear, first spring means disposed between the slide gear and the housing and adapted to bias the slide gear toward disengagement of the slide gear with the housing, second spring means disposed radially inwardly of the slide gear, and having a resilient force lower than that of the first spring means and adapted to bias the slide gear toward engagement of the slide gear with the housing, and cam means engaged directly with the first spring means through a spring holder member therefor and adapted (a) to develop an axial thrust required to compress the first spring means and then to permit the second spring means to bias the slide gear toward engagement upon rotation of the drive shaft, and (b) to permit the first spring means to bias the slide gear toward disengagement upon nonrotation of the drive shaft.

The above and other objects, advantages and features of the present invention will become apparent to those skilled in the art from the following description taken in conjunction with the accompanying drawings, wherein:

BRIEF DESCRIPTION OF THE DRAWINGS

FIG. 1A is a longitudinal sectional view illustrating a first preferred embodiment of the present invention shown in its disengaged position;

FIG. 1B is a longitudinal sectional view illustrating the first embodiment of the present invention shown in the position just short of clutch engagement;

FIG. 2 is a partial exploded view of the hub clutch members shown in FIGS. 1A-1C;

FIG. 3 is a partial enlarged sectional view of elements shown in FIGS. 1A-1C;

DESCRIPTION OF THE PREFERRED EMBODIMENTS

Figure 1C:
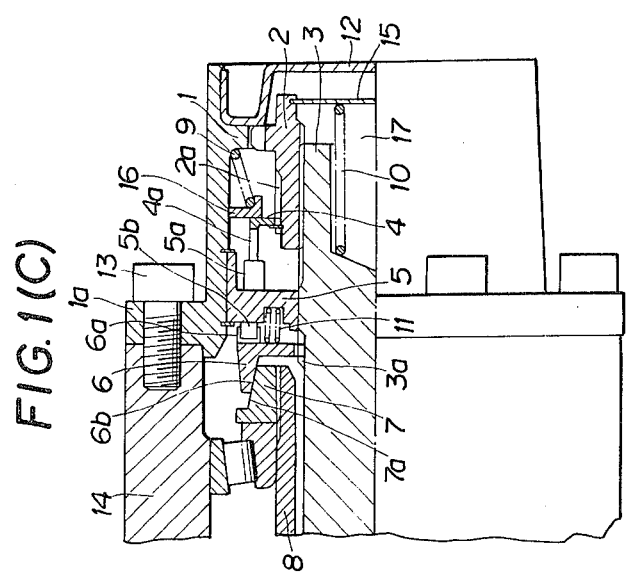
FIG. 1C is a longitudinal sectional view illustrating the first embodiment of the present invention shown in its engaged position.

Referring now to FIG. 1A, there is shown a hub clutch in its disengaged position according to the present invention. In FIG. 1A, a rotatable clutch housing 1 is secured through its outer flange portion 1a to a wheel hub 14 such as a front wheel hub of a four-wheel drive vehicle by a plurality of bolts 13 and has coupling teeth 1b formed on its inner periphery. An axially movable slide gear 2 in the form of a sleeve is disposed radially inwardly of the clutch housing 1. This slide gear 2 has coupling teeth 2b formed axially outwardly of the outer periphery thereof and adapted to be engaged with the teeth 1b of the housing 1, and also has splines 2a formed on the outer periphery, axially inwardly of teeth 2b. The slide gear 2 is slidably engaged with a rotatable drive shaft 3, which in one form of the invention may be an axle of a four-wheel drive vehicle, through mating splines. Onto the splines 2a of the slide gear 2 is movably engaged a ring-shaped cam member 4 through a set of grooves 4b formed on the inner periphery thereof. The cam member is axially movable over a predetermined distance and has a plurality of V-shaped projections 4a spaced from each other (refer to FIG. 2). As shown in FIG. 2, a retainer 5, rotatably disposed around the drive shaft 3, has a plurality of V-shaped grooves 5a engaged with corresponding projections 4a of the cam member 4, and a plurality of V-shaped projections 5b formed axially inwardly of grooves 5a. An axially movable brake member 6 is rotatably disposed aound the drive shaft 3 and has a plurality of V-shaped camming grooves 6a engaged with corresponding V-shaped projections 5b of the retainer 5, a cone-shaped friction surface 6b formed axially inwardly of grooves 6a, and a plurality of projections 6c formed on its inner periphery. A nut or brake member 7 having frustoconical friction surface 7a to be engaged with the cone-shaped friction surface 6b of the brake member 6 is secured to a sleeve-shaped stationary member 8 fixed around the drive shaft 3. A coil spring 9 having a predetermined resilient force is disposed between the housing 1 and a ring-shaped retainer member 16 arranged adjacent to the cam member 4 so as to bias the cam member 4 axially inwardly. A coil spring 10 having a resilient force lower than that of the coil spring 9 is disposed between a circular plate 15 fixed to the slide gear 2 and the left end face of a perforation or opening 17 formed in the radially central portion of the drive shaft. Between the retainer 5 and the brake member 6 is interposed a coil spring 11 to lightly push the brake member 6 against the nut 7. The opening of the housing 1 is sealed by a cover 12.

Figure 5A:
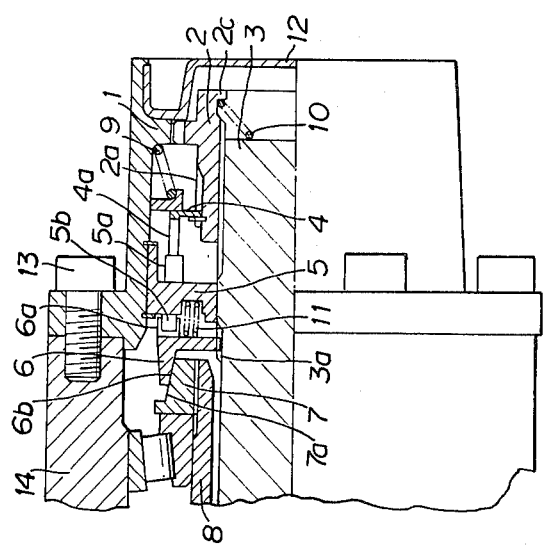
FIG. 5A is a longitudinal sectional view illustrating a second preferred embodiment of the present invention shown in its engaged position.
Figure 5B:
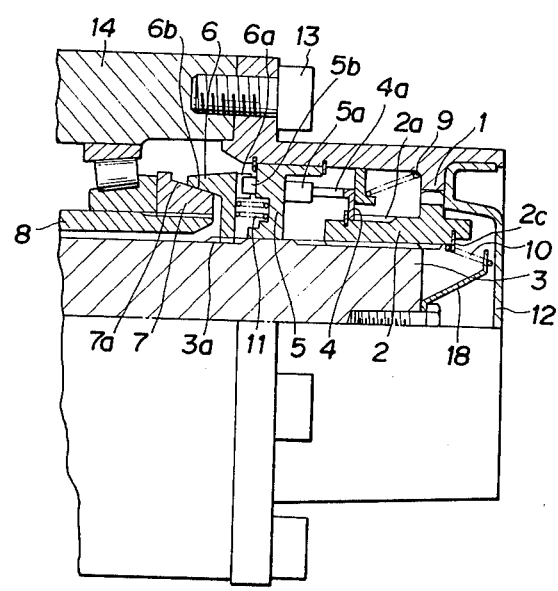
FIG. 5B is a longitudinal sectional view illustrating a third preferred embodiment of the present invention shown in its engaged position.

FIGS. 5A and 5B show other preferred embodiments of the wheel-hub clutch according to the present invention. In FIG. 5A, one end of coil spring 10 seats on the side face of the drive shaft 3 and the other end seats on an engaging portion 2c of the slide gear 2. In FIG. 5B, the slide gear 2, is forced axially outward by coil spring 10 provided between the engaging portion 2c of the slide gear 2 and an outer surface of a plate member 18 secured to the drive shaft 3.

Figure 4B:
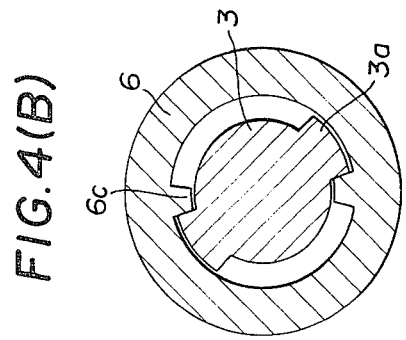
FIG. 4B is a cross sectional view illustrating the drive shaft and a brake member in an engaged position thereof.
Figure 4A:
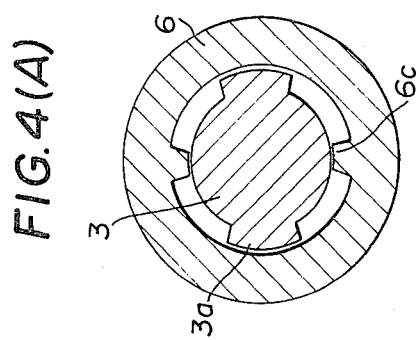
FIG. 4A is a cross sectional view illustrating a drive shaft and a brake member in a disengaged position thereof.

In an operation of the automatic hub clutch described above, referring to FIGS. 1A, 1B and 1C, when switching a selective lever (not shown), arranged at a suitable location, from two-wheel drive to four-wheel drive, the drive shaft 3 starts to rotate. With the rotation of the drive shaft 3, the slide gear 2, axially movably splined to the drive shaft 3 rotates together with the cam member 4. Since the V-shaped projections 4a of the cam member 4 are engaged into the V-shaped grooves 5a of the retainer 5 at this point in time, the retainer 5 is also rotated by the cam member 4 (see FIGS. 2 and 3). Consequently, the brake member 6 is rotated by the V-shaped projections 5b of the retainer 5. The brake member 6, lightly contacting the conical surface 7a of the nut or brake member 7, is further thereagainst pushed by the wedge action developed between the V-shaped projections 5b and the V-shaped grooves 6a of the brake member 6, thereby increasing the braking force. A desired braking force can be provided by suitable combination of the angle of the V-shaped grooves 6a with the conical angle of the brake member 6 so that the brake member 6 does not slip relative to the nut 7. Because the nut 7 is secured to the stationary member 8, rotation of the brake member 6 and thus rotation of the retainer 5 are restrained. Consequently, relative rotation is provided between the cam member 4 and the retainer 5 to develop an axial thrust therebetween, thereby to causing the cam member 4 to move axially outwardly to the position shown in FIG. 1B while compressing the coil spring 9. Then, the slide gear 2 is moved to the position shown in FIG. 1C by the action of the coil spring 10, so that the drive shaft 3 is connected to the housing, thereby providing a four-wheel drive mode. At this point of time, the projections 4a of the cam member come out of the V-shaped grooves 5a of the retainer 5 axially outwardly and consequently the force tending to rotate the retainer 5 and thus the force tending to push the brake member 6 against the nut 7 ceases. In such a case, the drive shaft 3 rotates relative to the brake 6. Thus, the positions of projections 3a of the drive shaft 3 relative to projections 6c of the brake member 6 shift from the relative position shown in FIG. 4A to that of FIG. 4B, and thus the brake member 6 then is rotated directly by the projections 3a of the drive shaft 3. As described above, at this time only the light resilient force of the coil spring 11 urges the brake member 6 into contact with the nut 7 because the axial thrust is not applied to the camming grooves 6a, thereby making it possible to prevent an increase of the frictional drag between brake member 6 and nut 7.

When the operator desires to establish two-wheel drive, he stops the vehicle and disengages four-wheel drive. The operator moves the vehicle in the opposite direction slightly and thus, the projections 3a for the drive shaft 3 leave the projections 6c of the brake member 6. Input to the brake member 6 is now applied only through the V-shaped grooves 6a and thus the brake member 6 is fixed to the nut 7. With movement of the vehicle the wheels rotate. As can be seen from FIG. 1C, both the slide gear 2 and the drive shaft 3 are rotated by the clutch housing 1, but the retainer 5 is rotated relative to the cam member 4 because the retainer 5 is fixed by the brake member 6, and the V-shaped projections 4a of the cam member 4 fall into the grooves 5a of the retainer 5 due to action of the coil spring 9. Consequently, the slide gear 2 moves to the position shown in FIG. 1A while compressing the coil spring 10, thereby disengaging the clutch housing 1 from the drive shaft 3 to provide two-wheel drive.

Although the present invention has been described with reference to preferred embodiments thereof, many modifications and alternations may be made within the spirit and scope of the present invention.

What is claimed is:

1. An automatic hub clutch for a four-wheel drive vehicle and comprising:
   a drive shaft adapted to be rotated in a four-wheel drive mode and not to be rotated in a two-wheel drive mode;
   a housing rotatably mounted with respect to said drive shaft; said housing having coupling teeth;

a slide gear having coupling teeth, said slide gear being mounted to be rotated in response to rotation of said drive shaft and to be movable axially thereof between an engagement position, whereat said coupling teeth of said slide gear mesh with said coupling teeth of said housing, and a disengagement position, whereat said coupling teeth of said slide gear are spaced from and not meshed with said coupling teeth of said housing;

first spring means, positioned between said slide gear and said housing and having a predetermined spring force, for biasing said slide gear axially of said drive shaft to said disengagement position;

second spring means, having a spring force less than said predetermined spring force of said first spring means, for biasing said slide gear axially of said drive shaft to said engagement position, said second spring means being positioned generally radially inwardly of said first spring means; and cam means for, upon rotation of said drive shaft, causing compression of said first spring means and thereby enabling said second spring means to move said slide gear axially to said engagement position, and for, upon nonrotation of said drive shaft, enabling said first spring means to move said slide gear axially to said disengagement position, said cam means comprising a brake member mounted for rotation relative to said drive shaft upon rotation of said drive shaft and operable to develop a braking force upon application to said brake member of an axial thrust, a cam member in engagement with said first spring means, and a retainer member positioned axially between said brake member and said cam member and having means cooperating therewith for applying said axial thrust to said brake member and for moving said cam member axially to compress said first spring means.

2. An automatic hub clutch as claimed in claim 1, wherein said second spring means is disposed between the base of a center hole formed in an end of said drive shaft and a plate member secured to said slide gear.

3. An automatic hub clutch as claimed in claim 1, wherein said second spring means is disposed between an end surface of said drive shaft and a groove formed in the inner periphery of said slide gear.

4. An automatic hub clutch as claimed in claim 1, wherein said second spring means is disposed between a plate member secured to a surface of said drive shaft and a shoulder formed on said slide gear.

5. An automatic hub clutch as claimed in claim 1, wherein said second spring means is positioned axially between said slide gear and said drive shaft.

6. An automatic hub clutch as claimed in claim 1, wherein said cam member does not act directly on said second spring means.

* * * * *